UnitedStates Patent Office 2,706,195
Patented Apr. 12, 1955

2,706,195

BIS(5,5,7,7-TETRAMETHYL-2-OCTENYL) DIALKYL-AMMONIUM SALTS

Warren D. Niederhauser, Huntingdon Valley, Pa., assignor to Rohm & Haas Company, Philadelphia, Pa., a corporation of Delaware No Drawing. Application June 26, 1952,
Serial No. 295,815

4 Claims. (Cl. 260—247)

This invention deals with quaternary ammonium salts of the structure

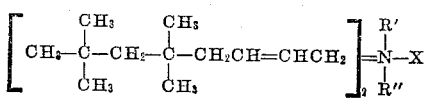

The significance of R′, R″, and X is discussed below. These quaternary ammonium salts are prepared in the form of their halides by reacting together a tertiary 1-amino-5,5,7,7-tetramethyl-2-octene and a 1-halo-5,5,7,7-tetramethyl-2-octene. This reaction is conveniently carried out by mixing the two reactants in an inert organic solvent and heating the mixture. Temperatures between about 60° C. and about 125° C. are desirably used. Suitable solvents include naphthas, benzene, toluene, xylene, isopropyl alcohol, butyl alcohol, nitromethane, formamide, acetonitrile, water, etc. Heating is conveniently done at reflux temperatures and continued until there is a high proportion of ionizable halide. Reaction times of two to twenty-four hours generally provide good conversion to the desired quaternary compound.

The 1-halo-5,5,7,7-tetramethyl-2-octenes are prepared in accordance with the reaction described in my application Serial No. 198,740, filed December 1, 1950. As there shown, a tertiary aliphatic halide is reacted with butadiene in the presence of a Friedel-Crafts catalyst between −10° C. and 90° C., preferably between 15° C. and 50° C.

The halides yield amines. For example, by reaction of a 1-halo-5,5,7,7-tetramethyl-2-octene and a secondary amine HNR′R″, there is formed a tertiary amine of the formula

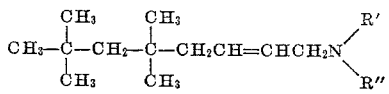

In the tertiary amines of particular interest with respect to the present invention R′ and R″ represent individually methyl or ethyl groups or together divalent chains which jointly with the amino nitrogen atom form a heterocycle, such as morpholino-, thiamorpholino-, pyrrolidino-, or piperidino-.

The preparation of the tertiary amines used as intermediates is illustrated by reaction of 1-chloro-5,5,7,7-tetramethyl-2-octene and dimethylamine. To a solution of eight parts of sodium hydroxide in 30 parts of water there was added 22.5 parts of an aqueous dimethylamine solution. The reaction vessel in which this mixture was prepared carried a refluxing system cooled with Dry Ice and acetone. To the mixture there was added 40.5 parts of 1-chloro-5,5,7,7-tetramethyl-2-octene. The reaction mixture was heated to gentle reflux and dimethylamine was slowly passed in over a period of four hours. Layers were allowed to form and were separated. The product layer was washed with water and stripped under reduced pressure. It corresponded by analysis to dimethyldodecenylamine. If desired, this compound may be distilled. It comes over at 72°–74° C./0.1 mm.

In place of dimethylamine there may be used 15 or more parts of diethylamine. The product then obtained is diethyldodecenylamine. This amine distills at 84°–85° C./0.5 mm. In a comparable manner 17.5 parts of morpholine may replace the above amines to give N-dodecenylmorpholine. This compound distills at 70°–95° C./0.15 mm. Any of these tertiary amines or their equivalents can be reacted with 1-halo-5,5,7,7-tetramethyl-2-octene to give useful quaternary ammonium salts.

In a typical preparation of bis(5,5,7,7-tetramethyl-2-octenyl)dimethylammonium chloride 211 parts by weight of 1-dimethylamino-5,5,7,7-tetramethyl-2-octene and 202.5 parts by weight of 1-chloro-5,5,7,7-tetramethyl-2-octene are mixed with 160 parts by weight of heptane. The mixture is heated at refluxing temperatures for eight hours. The reaction mixture is cooled and a white crystalline solid forms. It is separated by filtration and dried. The product thus obtained amounts to 330 parts by weight. It contains by analysis 8.6% of ionizable chlorine. The theoretical value for bis(5,5,7,7-tetramethyl-2-octenyl)-dimethylammonium chloride is 8.6%. The product melts at 151°–152° C., is hygroscopic, and readily forms a 40% solution in water.

The product is an unusually effective bactericide, having phenol coefficients of about 750 against *Salmonella typhosa* and of 1200 against *Micrococcus pyogenes*. It remains highly effective in hard water.

The compound is quite surface active. A 0.001% aqueous solution thereof has a surface tension of 45.7 dynes/cm., a 0.01% solution 38.1 dynes/cm., and a 0.1% solution 25.3 dynes/cm. at 25° C.

It gives a 10 second sinking time in the Draves test at 0.098% and a 25 second sinking time at 0.067%.

This compound and others of this invention provide efficient rewetting. This is quite unusual for quaternary ammonium compounds. For example, the above bis-(5,5,7,7-tetramethyl-2-octenyl)dimethylammonium chloride gave rewetting times by the tentative A. S. T. M. method as follows: 5 seconds at 0.34%, 10 seconds at 0.17%, and 25 seconds at 0.07%.

In place of 1-chloro-5,5,7,7-tetramethyl-2-ocetene there may be used 1-bromo-5,5,7,7-tetramethyl-2-octene to give the bromide, which has at least equally desirable properties. The chloride or bromide anion may be replaced with other anions through metathesis or through conversion of the salt to the free base and reaction of the base with an acid, which may be organic or inorganic. In these ways there may be introduced such anions as acetate, propionate, succinate, crotonate, pentachlorophenate, nitrophenate, sulfate, ethylsulfate, methylsulfate, etc.

These salts have phenol coefficients of 500 to 775 against *Salmonella typhosa* and of 1150 to 1250 against *Micrococcus pyogenes*.

These values are about three times those obtained with didodecyldimethylammonium salts. The latter are relatively insoluble in water at 25° C., whereas the compounds of this invention are particularly soluble, highly surface active, and efficient bactericidally. They are also active fungicidally.

Reaction of (5,5,7,7-tetramethyl-2-octenyl)diethylamine and 1-chloro- or 1-bromo-5,5,7,7-tetramethyl-2-octene by the method used above gives the bis(5,5,7,7-tetramethyl-2-octenyl)diethylammonium halide. This has a phenol coefficient against *S. typhosa* of about 300 and of about 850 against *M. pyogenes*.

In the same way there may be reacted the N-dodecenyl derivatives of morpholine, thiamorpholine, pyrrolidine, or piperidine with formation of soluble, surface active, highly bactericidal and fungicidal quaternary ammonium salts.

Another unusual and favorable property of the compounds of this invention is their capacity to take up iodine, thus acting as iodophors and forming complexes which are effective against bacteria even in the presence of considerable amounts of organic contaminants. For example, bis(5,5,7,7-tetramethyl-2-octenyl)morpholinium chloride is taken for the preparation of an aqueous 10% solution thereof. To this solution iodine is added in an amount of 12.5% of the weight of the quaternary. The mixture is stirred for 24 hours at room temperature to give a light tan colored, slightly opaque, viscous solution. This solution is completely effective in the Cantor-Shelanski test, using *Salmonella typhosa* as the test organism and one per cent whole milk as the organic contaminant. There was no survival of bacteria at 15 or 30 seconds even after ten additions of inoculant.

The same result is obtained when bis(5,5,7,7-tetramethyl-2-octenyl) dimethylammonium chloride or bromide is used in place of the above morpholinium salt. The morpholinium salt may like-wise be replaced with comparable efficiency with the corresponding pyrrolidinium, piperidinium, or thiamorpholinium compounds.

The compounds of this invention have the formula

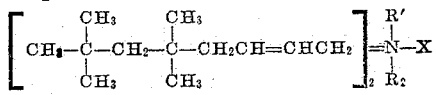

where X is an anion, preferably chlorine or bromine, and R' and R" taken singly represent alkyl groups of not over two carbon atoms and taken together represent a divalent chain from the class consisting of —$CH_2CH_2OCH_2CH_2$—, —$CH_2CH_2SCH_2CH_2$—, —$CH_2CH_2CH_2CH_2$—, and —$CH_2CH_2CH_2CH_2CH_2$—, which together with the nitrogen forms a heterocycle. They are freely soluble compounds which have unusual activity against bacteria and fungi and are highly effective iodophors.

I claim:

1. Compounds of the formula

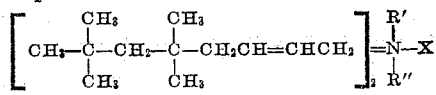

wherein R' and R" taken singly represent alkyl groups of not over two carbon atoms and taken together represent a divalent chain from the class consisting of —$CH_2CH_2OCH_2CH_2$—, —$CH_2CH_2SCH_2CH_2$—, —$CH_2CH_2CH_2CH_2$—, and —$CH_2CH_2CH_2CH_2CH_2$—, which together with the nitrogen forms a heterocycle and X is a member of the class consisting of chlorine and bromine.

2. As a new chemical compound bis(5,5,7,7-tetramethyl-2-octenyl)dimethylammonium chloride.

3. As a new chemical compound bis(5,5,7,7-tetramethyl-2-octenyl)dimethylammonium bromide.

4. As a new chemical compound bis(5,5,7,7-tetramethyl-2-octenyl)morpholinium chloride.

References Cited in the file of this patent

UNITED STATES PATENTS

| | | |
|---|---|---|
| 2,191,922 | Bruson | Feb. 27, 1940 |
| 2,432,905 | Kharasch et al. | Dec. 16, 1947 |
| 2,611,768 | Butler et al. | Sept. 23, 1952 |

FOREIGN PATENTS

| | | |
|---|---|---|
| 627,139 | Great Britain | July 29, 1949 |

OTHER REFERENCES

Chem. Abst., vol. 44, p. 1988 (1950).